(12) United States Patent
Suzuki et al.

(10) Patent No.: US 6,305,568 B1
(45) Date of Patent: Oct. 23, 2001

(54) RESIN FUEL TANK

(75) Inventors: Takeshi Suzuki; Toshiaki Ichitani; Makoto Kobayashi; Yoshihiro Shimizu, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/689,655

(22) Filed: Oct. 13, 2000

(30) Foreign Application Priority Data

Oct. 15, 1999 (JP) .................................................. 11-294146

(51) Int. Cl.⁷ .................................................. B65D 90/02
(52) U.S. Cl. ............................................. 220/562; 220/601
(58) Field of Search .................................. 220/562, 601, 220/661; 244/135 R; 180/314; 280/830

(56) References Cited

U.S. PATENT DOCUMENTS

| | | |
|---|---|---|
| 4,369,894 | * 1/1983 | Grover et al. . |
| 4,700,868 | * 10/1987 | Dirkin . |
| 5,344,038 | * 9/1994 | Freeman et al. . |
| 5,601,205 | * 2/1997 | Prechtel . |
| 6,227,402 | * 5/2001 | Shimojima et al. . |

\* cited by examiner

Primary Examiner—Stephen Castellano
(74) Attorney, Agent, or Firm—Arent Fox Kintner Plotkin & Kahn, PLLC

(57) ABSTRACT

A component attaching hole 5 is opened in the tank main body 1 constructed by laminating an inner shell 3 and an outer shell 4 via a fuel permeation preventing layer 2, and the auxiliary component 6 is welded to the external surface of the tank main body 1 in such a manner as to cover the component attaching hole 5. The component attaching hole is formed so as to be tapered in such a manner that the component attaching hole gets wider toward the external surface of the tank main body 1, and a boss portion 9 is formed on the auxiliary component 6 which is tapered so as to fit in the component attaching hole 5, whereby a fuel permeation preventing layer 8 laminated on the internal surface of the auxiliary component 6 is made to extend over the external surface of the boss portion 9. When the tank main body 1 and the auxiliary component 6 are welded together, the fuel permeation preventing layer 8 on the external surface of the boss portion 9 is tightly joined to the fuel permeation preventing layer 2 exposed at the component attaching hole 5.

4 Claims, 1 Drawing Sheet

RESIN FUEL TANK

BACKGROUND OF THE INVENTION

1. Field of the Invention

The present invention relates to a resin fuel tank for use mainly for vehicles.

2. Description of the Related Art

Conventionally know is a resin fuel tank in which a tank main body is constructed by laminating a resin inner shell and a resin outer shell via a fuel permeation preventing effect. Also know among those resin fuel tanks is a resin fuel tank in which a component attaching hole is opened in a tank main body and a resin auxiliary component is welded to the external surface of the tank main body in such a manner as to cover the component attaching hole. In this case, a fuel permeation preventing layer is laminated on the internal surface of the auxiliary component.

In the aforesaid conventional resin fuel tanks, the fuel permeation preventing effect can be improved individually with respect to the tank main body and the auxiliary component, but there may be a risk of fuel permeating from the welded portion between the tank main body and the auxiliary component.

SUMMARY OF THE INVENTION

The present invention was made in view of the above problem, and an object thereof is to provide a resin fuel tank in which fuel permeation from a welded portion between a tank main body and an auxiliary component can also securely be prevented.

With a view to solving the above problem, according to the invention, there is provided a resin fuel tank in which a tank main body is constructed by laminating a resin inner shell and a resin outer shell via a fuel permeation preventing layer, wherein a component attaching hole is opened in the tank main body and a resin auxiliary component is welded to an external surface of the tank main body in such a manner as to cover the component attaching hole. The component attaching hole is formed to be tapered in such a manner that the component attaching hole gets wider towards the external surface of the tank main body. A boss portion which is tapered so as to fit in the component attaching hole is formed on the auxiliary component. And, a fuel permeation preventing layer laminated on an internal surface of the auxiliary component is made to extend over an external surface of the boss portion. Thus, the fuel permeation preventing layer on the external surface of the boss portion is tightly joined to the fuel permeation preventing layer of the tank main body which is exposed at the component attaching hole.

According to the invention, the fuel permeation preventing layer of the tank main body is continuous with the fuel permeation preventing layer of the auxiliary component to thereby prevent the deviation of the fuel to the welded portion between the tank main body and the auxiliary component, thus making it possible to securely prevent the permeation of the fuel from the welded portion.

DETAILED DESCRIPTION OF THE PREFERRED EMBODIMENT

Figure 1:
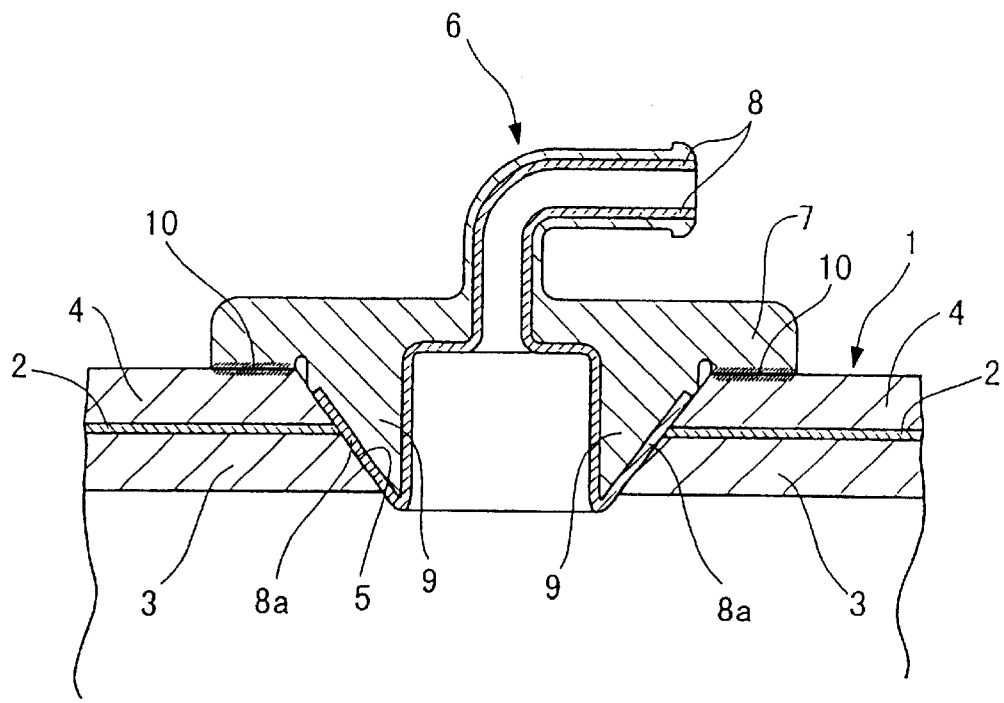
FIG. 1 is a sectional view showing a main part of an embodiment of a tank according to the invention.

Referring to FIG. 1, reference numeral 1 denotes a tank main body of a fuel tank. The tank main body 1 is consti- tuted by a resin inner shell 3 and a resin outer shell 4 which are laminated via a fuel permeation preventing layer 2. Additionally, a component attaching hole 5 is opened in the tank main body 1. A resin auxiliary component 6 such as a joint or the like which a tude communicating with a canister is connected is attached to the external surface of the tank main body 1 in such a manner as to cover the component attaching hole 5. A flange portion 7 is formed at a proximal end of the auxiliary component 6, which is welded to the tank main body 1 at this plange portion 7. In addition, a fuel permeation preventing layer 8 is laminated on the internal surface of the auxiliary component 6.

Note that it is desirable to use resin which is superior in mechanical strength such as high-density polyethylene for materials for the inner shell 3, the outer shell 4 and the auxiliary component 6, and a resin which has high fuel permeation perventing performance such as ethylene vinyl alcohol for material for the fuel permeation preventing layers 2, 8.

The component attaching hole 5 in the tank main body 1 is formed so as to be tapered in such a manner that the component attaching hole 5 gets wider toward the external surface of the tank main body 1. Additionally, a tapered boss portion 9 is formed on the auxiliary component 6 so as to fit in the component attaching hole 5, and the fuel permeation preventing layer 8 laminated on the internal surface of the auxiliary component 6 is made to extend over the external surface of the boss portion 9 so that the fuel permeation preventing layer 8 reaches as far as the vicinity of the flange portion 7.

When the auxiliary component 6 is welded to the tank main body 1 at the flange portion 7, an extending portion 8a from the fuel permeation preventing layer 8 extending over the external surface of the boss portion 9 tightly joined as exposed portion of the fuel permeation reventing layer 2 exposed at the component attaching hole 5 in the tank main body 1. Thus, the fuel permeation preventing layer 2 of the tank main body 1 and fuel premeation preventing layer 8 of the auxiliary component 6 become integrally continuous with each other, whereby fuel is preventing layers to reach a welded portion 10 between the tank main body 1 and the auxiliary component 6, thereby the permeation of the fuel from the welded portion 10 being securely prevented.

Figure 2:
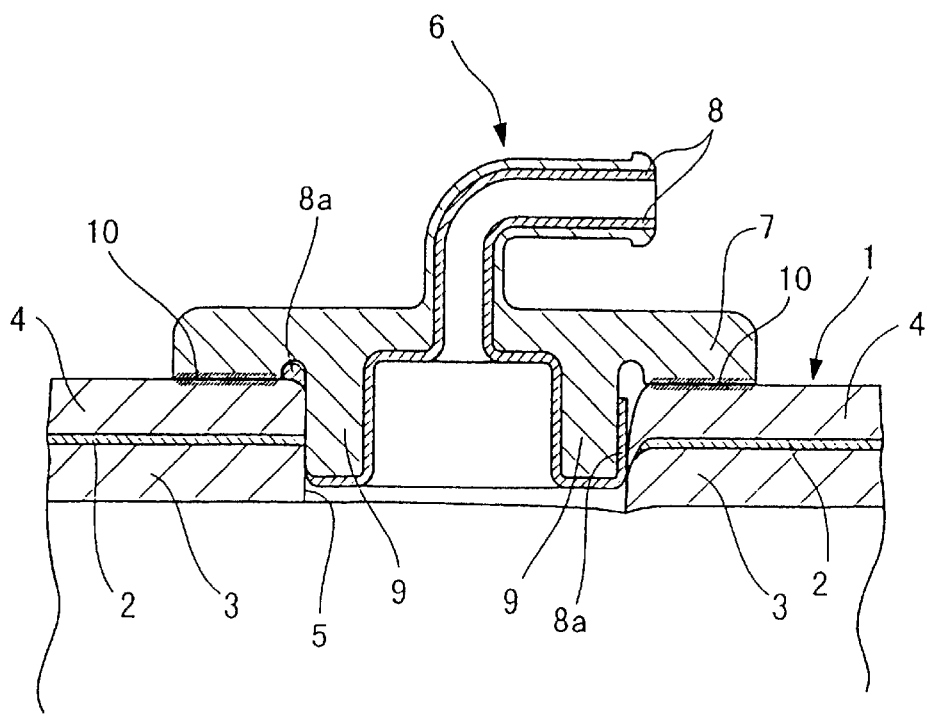
FIG. 2 is a sectional view showing a comparison example.

It is also conceived that the component attaching hole 5 and the boss portion 9 are formed so as not to be tapered as shown in FIG. 2, and that the boss portion 9 is press fitted in the component attaching hole 5 so that the extending portion 8a of the fuel permeation preventing layer 8 extending over the external surface of the boss portion 9 tightly joins an exposed portion of the fuel permeation preventing layer 2 exposed at the component attaching hole 5. In this construction, when the boss portion 9 is press fitted in the component attaching hole 5, however, as shown in a left-half portion of FIG. 2, the extending portion 8a of the fuel permeation preventing layer may be fracture, or, as shown in a right-half portion of FIG. 2, the outer shell 4 may be collapsed or rolled up, whereby there may be caused a risk that the extending portion 8a of the fule permeation pre- venting layer 8 does not tightly join the exposed portion of the fuel permeation preventing layer 2. On the contrary to this, with the embodiment shown in FIG. 1, the extending portion 8a of the fuel permeation preventing layer 8 can be tightly joined to the exposed portion of the fuel permeation preventing layer 2, thereby improving the fuel permeation preventing effect.

As is clear from what has been described heretofore, according to the invention, the fuel permeation preventing layer of the tank main body and the fuel permeation preventing layer of the auxiliary component are intergrally continuous with each other so as to effectively prevent the permeation of fuel from the welded portion between the tank main body and the auxiliary component.

While only certain embodiments of the invention have been specifically described herein, it will be apparent that numerous modifications may be made thereto without departing from the spirit and scope of the invention.

What is claimed is:

1. A resin fuel tank comprising:
    a tank main body constructed by laminating a resin inner shell and a resin outer shell via a fuel permeation preventing layer, said tank main body being opened with a tapered component attaching hole formed such as to enlarge toward the external surface of said tank main body; and
    a resin auxiliary component welded to an external surface of said tank main body in such a manner as to cover said component attaching hole, said auxiliary component comprising:
        a tapered boss portion formed such as to fit in said component attaching hole; and
        a fuel permeation preventing layer laminated such as to extend from an internal surface of said auxiliary component over an external surface of said boss portion,
    whereby said fuel permeation preventing layer on the external surface of said boss portion is tightly joined to said fuel permeation preventing layer of said tank main body which is exposed at said component attaching hole.

2. The resin tank according to claim 1, wherein said auxiliary component is a joint having a tube communicating with a canister.

3. The resin fuel tank according to claim 1, wherein said auxiliary component includes a flange portion at a proximal end thereof, and said flange portion is welded to said tank main body.

4. The resin fuel tank according to claim 1, wherein said inner shell, said outer shell and said auxiliary components are made of high-density polyethylene, and said fuel permeation presenting layer is made of ethylene vinyl alcohol.

* * * * *